US008325658B2

(12) United States Patent
Rosen et al.

(10) Patent No.: US 8,325,658 B2
(45) Date of Patent: Dec. 4, 2012

(54) QUALITY OF SERVICE (QOS) RESOURCES WITHIN A WIRELESS COMMUNICATIONS SYSTEM

(75) Inventors: Eric C. Rosen, Solana Beach, CA (US); Arulmozhi K. Ananthanarayanan, San Diego, CA (US); Ashu Razdan, San Diego, CA (US); Vivek Manpuria, San Diego, CA (US); Arvind Santhanam, San Diego, CA (US); David J. Ross, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 12/509,980

(22) Filed: Jul. 27, 2009

(65) Prior Publication Data

US 2011/0021202 A1  Jan. 27, 2011

(51) Int. Cl.
 *H04W 4/00* (2009.01)
(52) U.S. Cl. .................. 370/329; 370/468; 455/450
(58) Field of Classification Search .......... 370/319–327, 370/347–350, 329–338, 468–473, 487–497; 455/560, 434, 450–453, 464, 446–447
See application file for complete search history.

(56) References Cited

U.S. PATENT DOCUMENTS

| 6,690,920 B2* | 2/2004 | Saarinen et al. ........... 455/67.11 |
| 2003/0135626 A1 | 7/2003 | Ray et al. |
| 2006/0015354 A1* | 1/2006 | Shrum et al. ................. 705/1 |
| 2006/0040694 A1 | 2/2006 | Yoon et al. |
| 2007/0058561 A1* | 3/2007 | Virgile ........................... 370/252 |
| 2007/0143483 A1 | 6/2007 | Lim et al. |
| 2007/0153769 A1 | 7/2007 | Comstock et al. |

(Continued)

FOREIGN PATENT DOCUMENTS

EP 1643690 A1 4/2006

(Continued)

OTHER PUBLICATIONS

3GPP2: "VoIP Codecs and Protocols—3GPP2 C.S0085-A—Version 1.0", Jan. 27, 2010, pp. 1-31, XP55002296, ftp://ftp.3gpp2.org/TSGC/Working/2010/2010-01-Bangkok/TSG-C-2010-01-Bangkok/WG1/ Retrieved from the Internet: URL:ftp://ftp.3gpp2.org/TSGC/Working/2010/ 2010-01-Bangkok/TSG-C-2010-01-Bangkok/WG1/.

(Continued)

*Primary Examiner* — Pao Sinkantarakorn
*Assistant Examiner* — Iqbal Zaidi
(74) *Attorney, Agent, or Firm* — Raphael Freiwirth (57) ABSTRACT

In an embodiment, an access terminal sends a request for a level of Quality of Service (QoS) resources to an access network, the QoS resource request associated with a call attempt by the access terminal. The access terminal proceeds with call set-up for the call attempt irrespective of whether the access network grants the QoS resource request. Alternatively, the access terminal waits for an extended period of time before the call attempt is permitted to fail. In a further example, in the event of call failure, the access terminal can refrain from informing a user thereof of the call failure. In another embodiment, the access network can respond to the QoS resource request with an allocation of a lower level QoS resources than requested if the requested QoS resources are not available. The access terminal can likewise be permitted to participate in the call with the lower level QoS resources.

19 Claims, 8 Drawing Sheets

U.S. PATENT DOCUMENTS

| | | | |
|---|---|---|---|
| 2007/0160045 | A1 | 7/2007 | Payyappilly et al. |
| 2009/0005054 | A1 | 1/2009 | Moritomo et al. |
| 2009/0022106 | A1 | 1/2009 | Ue et al. |
| 2009/0185527 | A1 | 7/2009 | Akhtar et al. |
| 2009/0279510 | A1 | 11/2009 | Ahn et al. |
| 2009/0280849 | A1 | 11/2009 | Rosen et al. |
| 2010/0004012 | A1 | 1/2010 | Ananthanarayanan et al. |
| 2010/0074109 | A1* | 3/2010 | Klingenbrunn et al. ...... 370/230 |
| 2011/0211439 | A1 | 9/2011 | Manpuria et al. |

FOREIGN PATENT DOCUMENTS

| | | |
|---|---|---|
| WO | WO2008040023 | 4/2008 |

OTHER PUBLICATIONS

3rd Generation Partnership Project; Technical Specification Group (TSG) RAN; RAB Quality of Service Negotiation over Iu (Release 4), 3GPP Standard; 3GPP TR 25.946, 3RD Generation Partnership Project (3GPP), Mobile Competence Centre ; 650, Route Des Lucioles ; F-06921 Sophia-Antipolis Cedex ; France, No. V4.0.0, Mar. 1, 2001, pp. 1-18, XP050369549.

Anonymous: 3GPP2-Drafts, 2500 Wilson Boulevard, Suite 300, Arlington, Virginia 22201, USA 0RD-0000-00-00, Jun. 30, 2008, XP040480130.

Engineering Services Group—Qualcomm: "1xEV-DO Revision A Over-the-Air QoS Configuration Example; Aug. 30, 2007; 80-W1102-1 Rev B", Aug. 30, 2007, pp. 1-59, XP55002297, Retrieved from the Internet: URL:http://www.qualcomm.com/common/documents/white_papers/ESG_EVDO_RevA.pdf.

IEEE, Piscataway, NJ, USA, Feb. 29, 2008, XP040393795.

International Search Report and Written Opinion—PCT/US2010/043421—ISA/EPO—May 10, 2011.

International Search Report and Written Opinion—PCT/US2011/024968—ISA/EPO—Jul. 27, 2011.

Lucent Technologies: "High-Level Flow for Priority Services and Definitions", 3GPP2-Drafts, 2500 Wilson Boulevard, Suite 300, Arlington, Virginia 22201 USA, Sep. 11, 2006, XP040267183.

QoS Interoperability and Policy Management Recommendations, 3G Americas Dec. 31, 2007, XP002607416, Retrieved from the Internet:URL:http://www.3gamericas.org/documents/3GAmericas_QoSPolicy_Dec19-07.pdf.

* cited by examiner

QUALITY OF SERVICE (QOS) RESOURCES WITHIN A WIRELESS COMMUNICATIONS SYSTEM

BACKGROUND OF THE INVENTION

1. Field of the Invention

The invention relates to acquisition and allocation of quality of service (QoS) resources within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given group, sector, subnet, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques.

Additionally, modern wireless networks are built using network technologies with the ability to offer distinctly different classes (or "quality") of service to user applications. As an example, voice and multimedia based applications often require and are given a higher quality of service from wireless networks, as voice based services tend to be sensitive to network interruptions (packet loss) and delays (jitter). Generic (low-speed) data applications, however, are typically less sensitive to packet loss and jitter that may be introduced by a wireless network.

Real-time multimedia based applications that require quality-of-service guarantees to offer service (including but not limited to VoIP-based applications such as high-performance push-to-talk (PTT)) are hence particularly sensitive to the inability of a wireless network to offer the specific quality-of-service (QoS) guarantees required by such services. These QoS guarantees may at times be difficult for the network provide because the QoS guarantees can either (i) require a higher level of quality of service than what the network may have been originally designed to provide across various geographical and mobility scenarios that can be encountered in the network. Including, for example, mobility events that require transfer of the packet data session or quality-of-service parameters between different parts of the network, (ii) require a type of quality-of-service that the network cannot always provide, particularly during periods of high network utilization or when multiple services simultaneously compete for the same limited network resources, or (iii) require quality-of-service guarantees that may have availability constraints that are unique to the application's specific quality-of-service requirements.

As a result, when initially deployed in a new network environment, applications relying on QoS guarantees (e.g., real-time multimedia tend) to experience abrupt (rather than graceful) disruptions in service availability when the network is unable to provide the necessary QoS guarantees. An abrupt service disruption provides a degradation to the user experience and may lead to the reduced demand of such applications.

Conventional solutions to this problem involve dedicating network resources to ensure that the application (e.g., a real-time multimedia application) always has access to the required quality-of-service. While this approach may be effective, it is also expensive, and does not offer much flexibility in providing a graceful degradation of the offered service if the quality-of-service resources are not available. Applications that rely dedicating network resources to ensure service availability typically do not scale well. Scalable applications that require network-level quality-of-service guarantees are typically allowed to only request such guarantees at "call time" and release the guarantee when the resources are no longer required for that call instant (e.g. when the "call" terminates).

SUMMARY

In an embodiment, an access terminal sends a request for a level of Quality of Service (QoS) resources to an access network, the QoS resource request associated with a call attempt by the access terminal. The access terminal proceeds with call set-up for the call attempt irrespective of whether the access network grants the QoS resource request. Alternatively, the access terminal waits for an extended period of time before the call attempt is permitted to fail. In a further example, in the event of call failure, the access terminal can refrain from informing a user thereof of the call failure. In another embodiment, the access network can respond to the QoS resource request with an allocation of a lower level QoS resources than requested if the requested QoS resources are not available. The access terminal can likewise be permitted to participate in the call with the lower level QoS resources.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
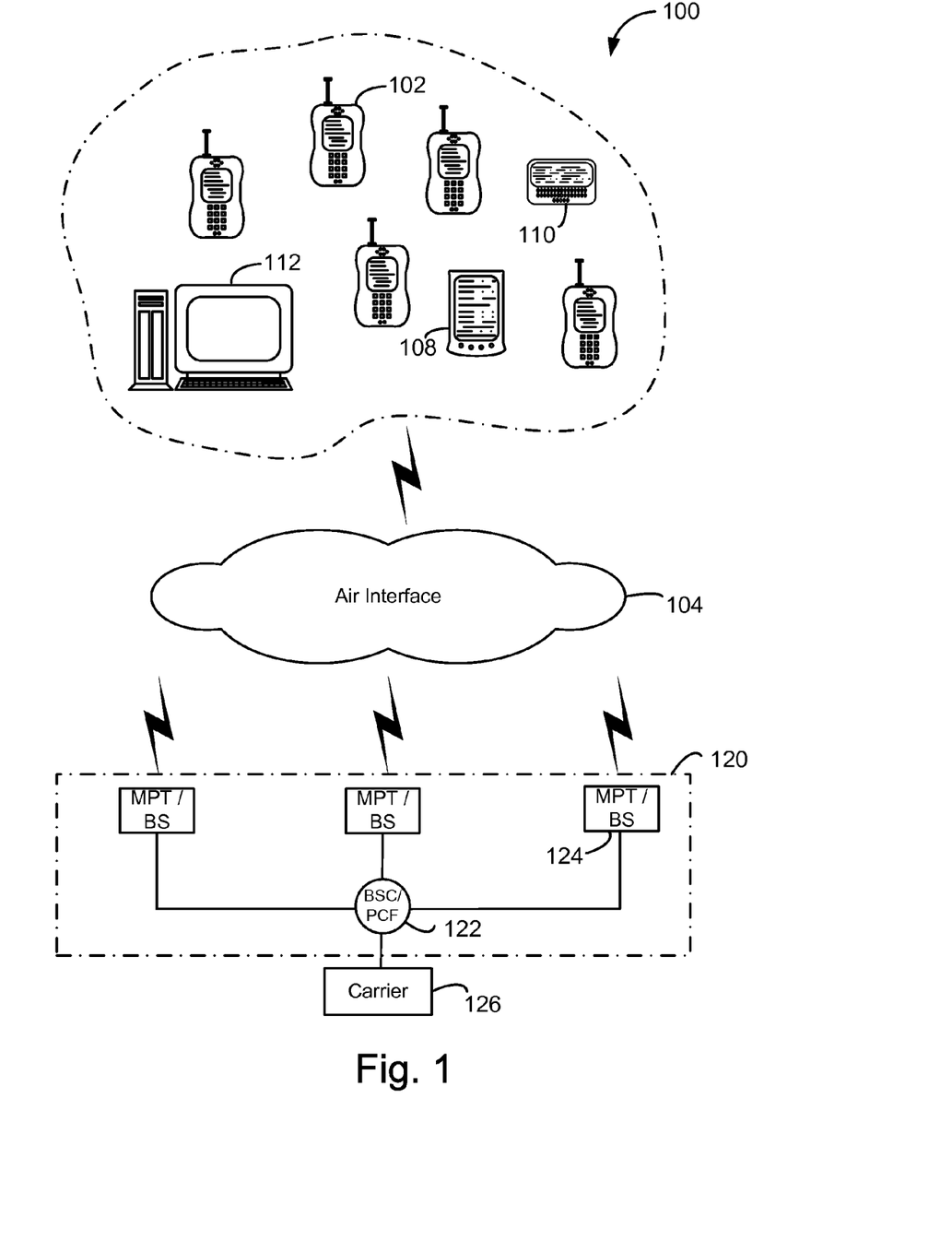
FIG. 1 is a diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
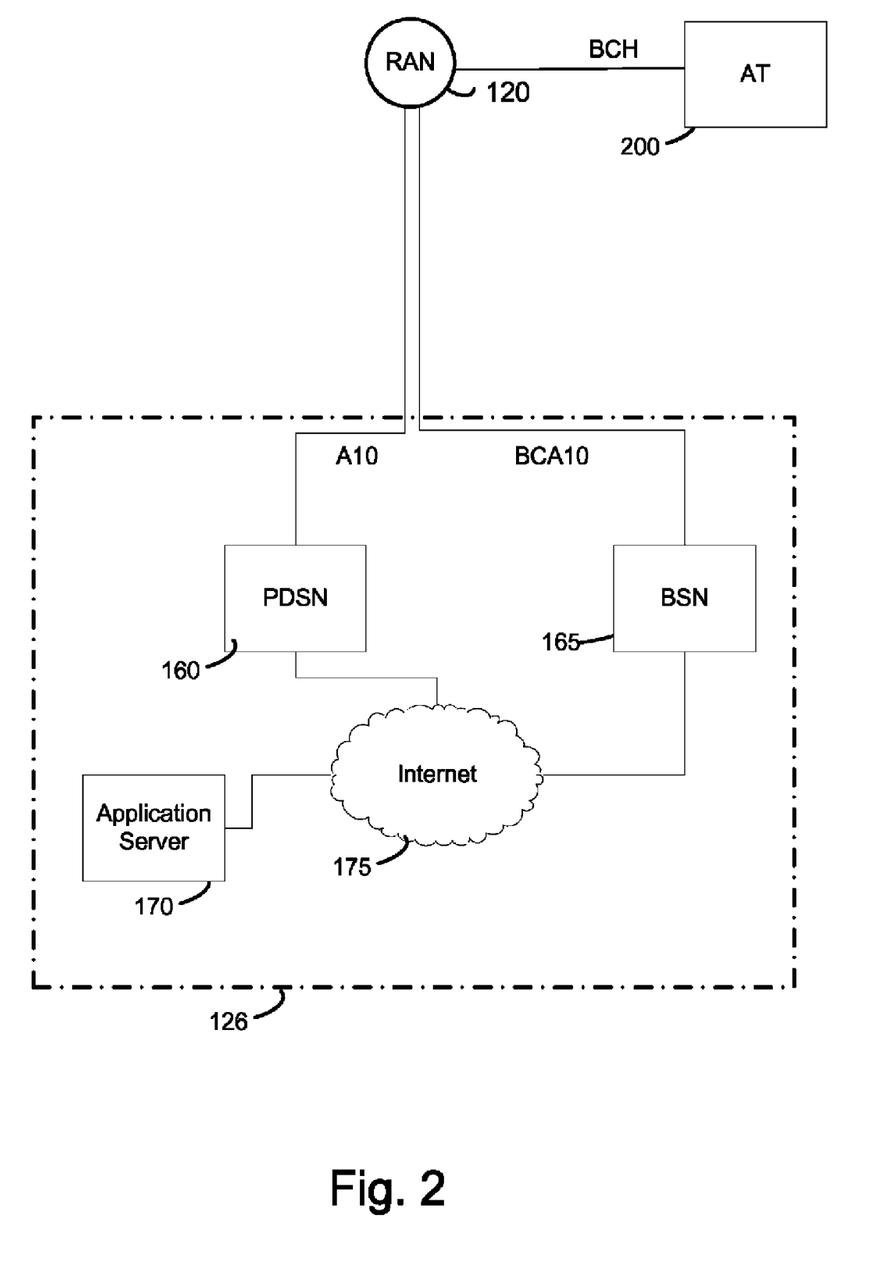
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
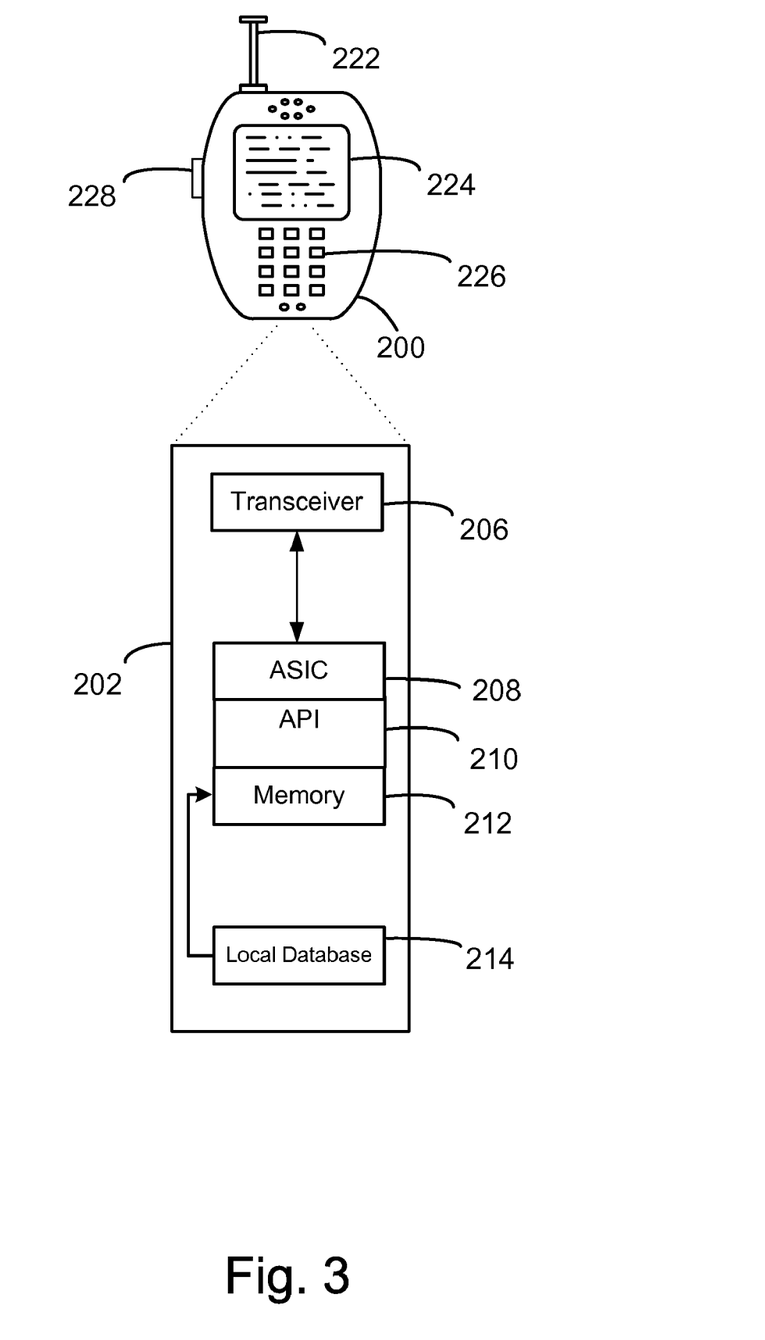
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Generally, as discussed herein group communications, PTT calls, multimedia communications can be provided by various wireless technologies and protocols. For example, a group call can be performed using broadcast, multicast, and/or unicast protocols. Accordingly, embodiments are not limited to any specific wireless technology or protocol.

In wireless communications systems, Quality of Service (QoS) is a general term that incorporates parameters such as, bandwidth, latency, and/or jitter to describe a network's ability to customize the treatment of specific classes of data. For example, QoS can be used to prioritize video transmissions over Web-browsing traffic. Advanced networks can offer greater control over how data traffic is classified into classes and greater flexibility as to how the treatment of that traffic is differentiated from other traffic. For example, an AT can request a particular QoS level ("QoS resources") to be associated with a communication session. If the RAN 120 has sufficient QoS resources in the AT's sector, the QoS level can be allocated to the requesting AT.

Figure 4:
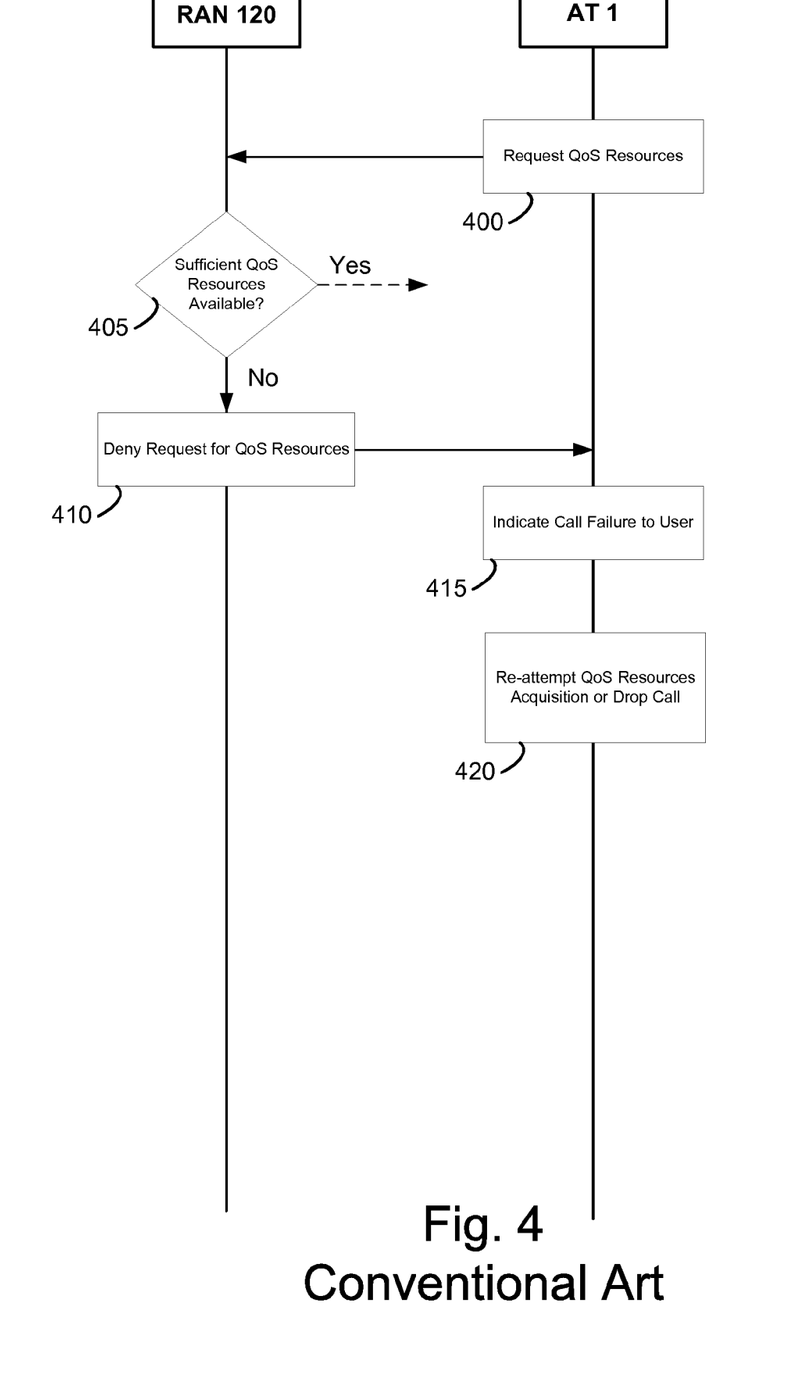
FIG. 4 illustrates a conventional manner of requesting Quality of Service (QoS) resources.

FIG. 4 illustrates a conventional manner of requesting QoS resources focusing on the process, if the requested resources are not available. Referring to FIG. 4, a given AT ("AT 1") sends a message on a reverse link access channel to the RAN 120 to request a given amount of QoS resources, 400 (e.g., bandwidth, latency and/or jitter requirements for a call). For example, in 1xEV-DO Rev. A or 1xEV-DO Rev. B networks, the QoS request of 400 may correspond to a ReservationOnRequest message on the reverse link access channel. While not shown in FIG. 4, other messaging may also be exchanged between the RAN 120 and AT 1, such as a ConnectionRequest message to obtain a traffic channel (TCH) for AT 1, a ChannelAssignment message allocating the TCH to AT 1 on the downlink, etc.

The RAN 120 receives the request for QoS resources and determines whether sufficient QoS resources are available with AT 1's sector for allocation to AT 1. For example, the determination of 405 can be based on the RAN 120's QoS resource obligations to other ATs within AT 1's sector. In 405 of FIG. 4, assume that the RAN 120 determines that sufficient QoS resources are not available for AT 1. In other words, the RAN 120 cannot accommodate AT 1's request for QoS resources. In this case, the RAN 120 sends a message on a downlink channel to AT 1 indicating that AT 1's QoS request for resources has been denied, 410. For example, in 1xEV-DO Rev. A or 1xEV-DO Rev. B networks, the denial message of 410 may correspond to a Fwd/RevReservationReject message on the downlink channel.

In 415, AT 1 notifies its user of the call failure. After AT 1 receives the message indicating that the QoS resource request has been denied, 420, and indicates the call-failure to the user, 415, the user of AT 1 can instruct AT 1 to either re-attempt to obtain QoS resources from the RAN 120 (e.g., by sending another ReservationOnRequest on the reverse link access channel to the RAN 120, as in 400), or can drop the call. As will be appreciated by one of skill in the art, call failures can frustrate subscribers, can cause subscribers to abandon call attempts and/or can otherwise degrade the subscriber's experience with the service, as discussed above.

Embodiments of the present invention, which will now be described in more detail, are directed to increasing a likelihood that an AT wishing to participate in a call with a given amount of QoS resources will be granted at least a partial amount of the requested QoS resources, and/or decreasing a delay before which the full or partial amount of QoS resources are allocated to the AT.

Multiple approaches for providing a graceful degradation in service availability for an application that nominally requires a high-level of quality-of-service guarantee from a network are described in the following. In each approach, the logic surrounding how the application (e.g., a multimedia application) itself requests quality-of-service at "call-time" is modified to allow for a graceful degradation of service availability. As used herein the term "call" refers to any communication session within a wireless network (e.g., a PTT call, video streaming, etc.) and "call time" refers to the initial communication to setup and/or establish the communication session.

For purpose of describing the various aspects of embodiments of the invention, it is assumed that an application that is dependent on the network to provide a certain quality-of-service guarantee in order for the application to offer service would follow a high level procedure of (1) first requesting quality-of-service from the network at "call time" and either (2A) offering the service if the network is able to grant the requested quality-of-service at call-time or (2B) denying access to the service until the next call attempt if the network is not able to grant the quality-of-service at call-time. In the case of (2A), the application is assumed to release the granted quality-of-service when the call terminates.

In one embodiment, the application nominally always requests quality-of-service at call-time as described above, but ignores the result of requesting quality-of-service for the purpose of determining whether the call can proceed. The application uses any provided quality-of-service guarantee to place the call when the network is able to provide the requested quality-of-service guarantee, but also allows the call to proceed without the requested quality-of-service guarantee in the event the network is not able to provide the requested quality-of-service guarantee.

This embodiment provides for a graceful degradation in service by allowing a high-quality version of the application to be offered when the network is able to provide the quality-of-service guarantee, and a lower (e.g., degraded) version of the application to be offered when the network is not. However, because the degraded form of the application is offered without the benefit of any quality-of-service guarantees, the degraded form of the application service can be highly dependent on network performance when the requested quality-of-service guarantee is not available. Conventionally, as will be appreciated from the description of FIG. 4 above, the RAN 120 will simply fail QoS in the event a requested service level is unavailable for assignment, and will not provide a degraded level of service. RANs, such as the RAN 120, are generally designed to honor specific QoS profiles and not to make decisions in the event that the entire profile cannot be honored.

The QoS request may be conventional or may be bundled with other messages in an initial communication. For example, the QoS resource request message (e.g., the ReservationOnRequest message in 1xEV-DO networks) may be sent independently of other messages (i.e., non-bundled). In another example, the ReservationOnRequest message may be bundled with other messaging, such as a ConnectionRequest message that requests a TCH assignment, a Data-over-Signaling message, and the like.

Figure 5A:
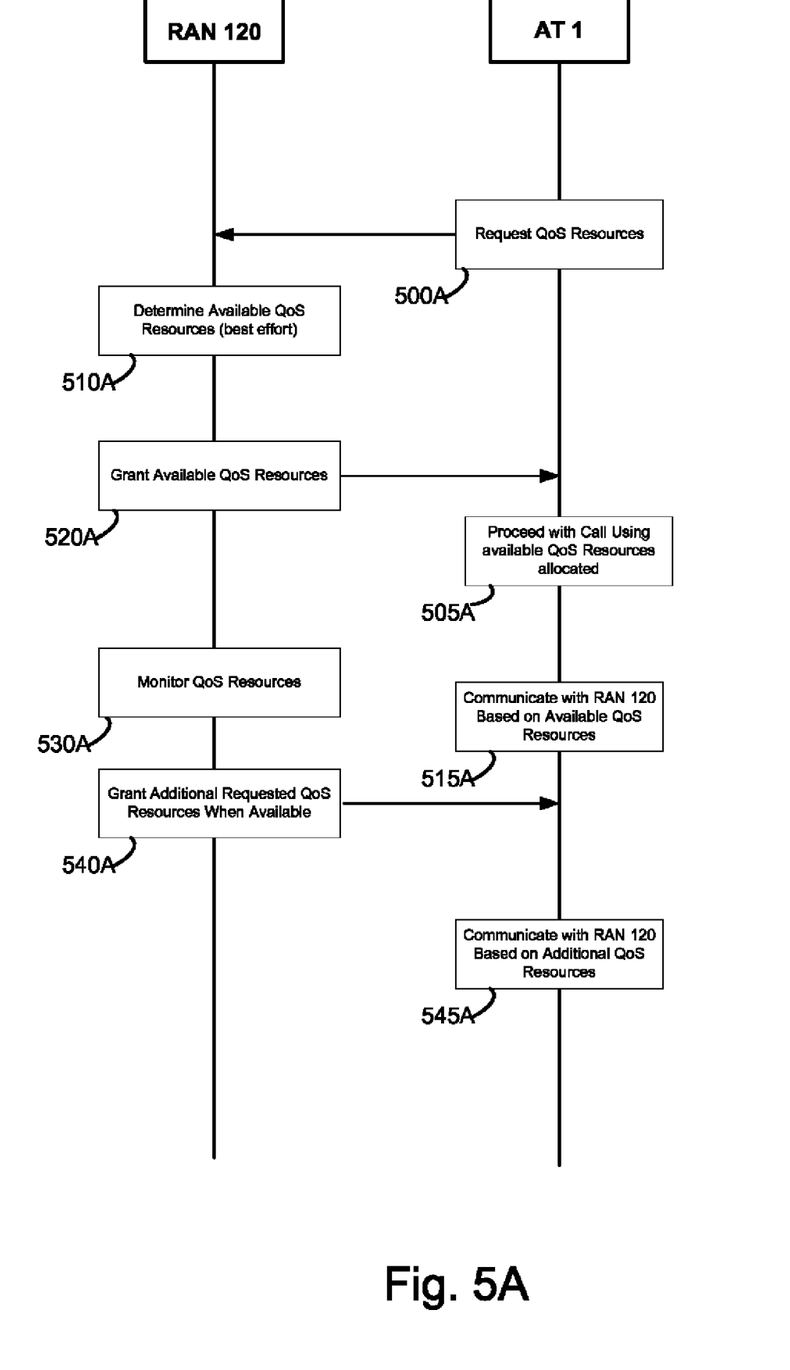
FIG. 5A illustrates a QoS resource acquisition process according to another embodiment of the present invention.

FIG. 5A illustrates a QoS resource acquisition process corresponding to the aforementioned embodiment of the invention. Referring to FIG. 5A, in 500A, a given AT ("AT 1") sends a message (e.g., on a reverse link access channel) to the RAN 120 to request a given amount of QoS resources, (e.g., based on the requirements for the call). Upon receiving the QoS resource request message at the RAN 120, the RAN 120 determines whether sufficient QoS resources are available for allocation to AT 1, 510A. While not shown expressly in FIG. 5A, if sufficient QoS resources are determined to be available in 510A, the QoS resources are allocated to AT 1. In this example, assume that sufficient QoS resources are determined not to be available in 510A. Next, the RAN 120 determines the level of QoS resources that are available for allocation to AT 1, 510A, and the RAN 120 grants the determined level of QoS resources, 520A. After sending the QoS resource request message in 500A, AT 1 simply assumes that at least some level of QoS resources will be allocated by the RAN 120, 505A. Accordingly, AT 1 continues the call set-up process regardless of which (if any) of the requested QoS resources are reserved or guaranteed for AT 1. Thus, AT 1 proceeds with the call, 515A, irrespective of whether any or all of the requested QoS resources are actually granted by the RAN 120.

As will be appreciated, the determined amount of QoS resources (i.e., the RAN 120's 'best effort' at satisfying the QoS resource request message) is less than that amount of QoS resources requested by AT 1, because the RAN 120 determined in 510A that the requested amount of QoS could not be granted. Again, it is understood that the RAN 120 would simply grant the requested QoS resources if those resources are available.

Returning to FIG. 5A, assume that the RAN 120 may maintain, for a period of time, the initial QoS resource request message received from AT 1 at 500A. During AT 1's call, the RAN 120 continues to monitor its available QoS resources, 530A. Accordingly, if the monitoring of 530A indicates that additional QoS resources become available during the call, the RAN 120 may, on its own initiative (e.g., without receiving a subsequent ReservationOnRequest message) determine if the requested QoS can be granted. If so, the RAN 120 grants the newly available QoS resources to AT 1, 540A. After which, AT 1 communicates with the RAN 120 based on the granted QoS resources, 545A. The monitoring and additional QoS resource allocation of 530A and 540A, respectively, may continue until the amount of QoS resources indicated by the QoS resource request message of 500A is allocated to AT 1. Accordingly, even though the 'best effort' QoS resources are allocated relatively quickly in 520A, this does not preclude the RAN 120 from sending a later message granting a higher level of QoS resources (e.g., the full requested level).

In FIG. 5A, the QoS resource request of 500A has been described for an initial call attempt. However, it is possible that the process of FIG. 5A can alternatively describe a subsequent call attempt (e.g., a second call attempt) that follows an earlier call attempt, as will now be described with respect to FIG. 5B.

In an alternative embodiment, the requesting application (e.g., a multimedia application) nominally requests quality-of-service at call-time, as described above, and fails the call when the requested quality-of-service guarantee cannot be provided by the network. However, for a (subsequent) call attempt that closely follows (e.g., within a relatively short period of time) a call attempt that failed due to the network previously not being able to offer the requested quality-of-service guarantee at call-time, the application requests quality-of-service but ignores the result of requesting quality-of-service for the purpose of determining whether the subsequent call can proceed. The application uses any provided quality-of-service guarantee to place this subsequent call when the network is able to provide the requested quality-of-service guarantee, but also allows the subsequent call to proceed without the requested quality-of-service guarantee in the event the network is not able to provide the requested quality-of-service guarantee.

This embodiment results in a graceful degradation in service by allowing a high-quality version of the application to be offered when the network is able to provide the quality-of-service guarantee, and a lower (degraded) version of the application to be offered after an initial failure when the network is not. The algorithm provides a degraded form of the application service that is highly dependent on network performance only when the requested quality-of-service guarantee cannot be initially provided available; otherwise, the application provides the high-quality version of the service after a single initial failure.

Figure 5B:
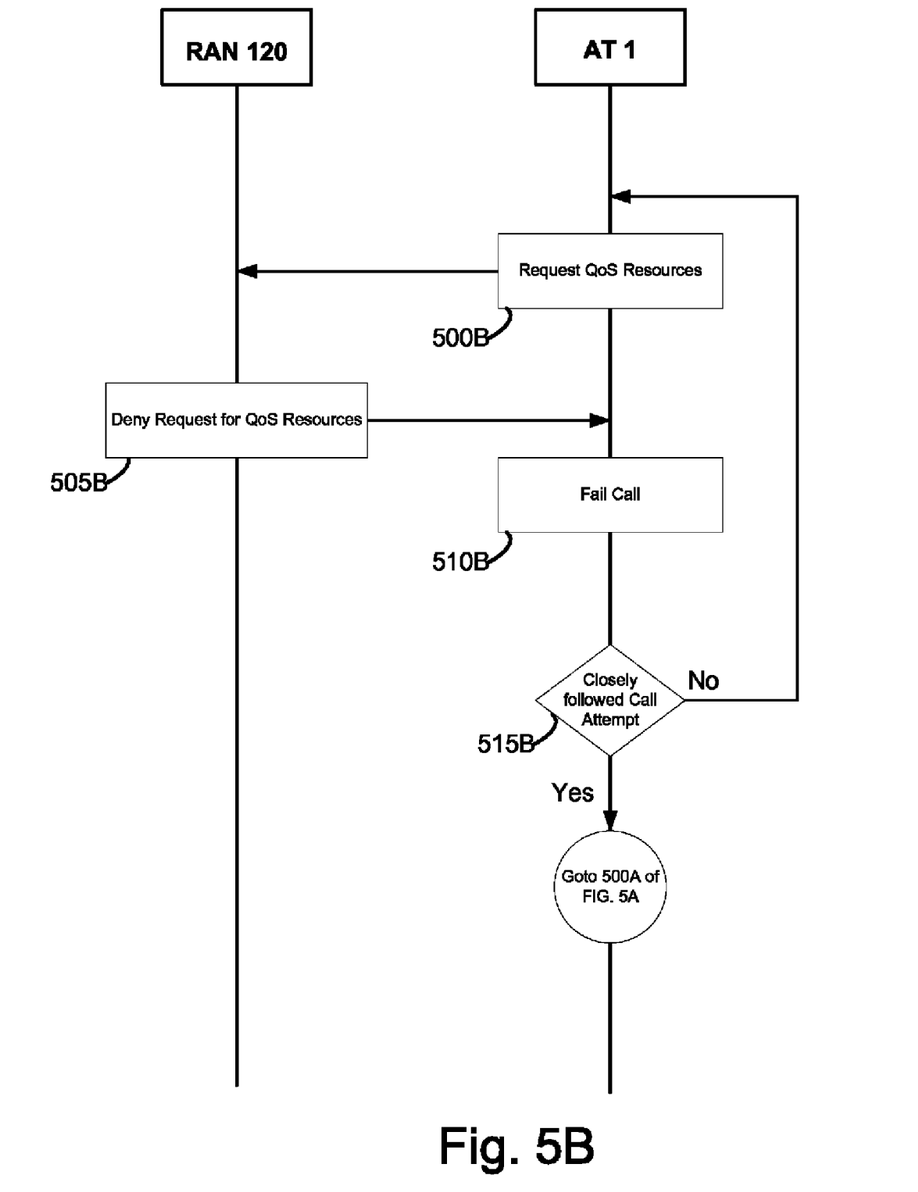
FIG. 5B illustrates a process preceding the process of FIG. 5A according to an embodiment of the invention.

Referring to FIG. 5B, in 500B, a given AT ("AT 1") sends a message (e.g., on a reverse link access channel) to the RAN 120 to request a given amount of QoS resources for a requesting application. In the example of FIG. 5B, it is assumed that the QoS resource request of 500B is associated with an initial call attempt (i.e., a first time AT 1 has attempted to make a particular call). The QoS resource request may otherwise be configured as discussed above with respect to 500A of FIG. 5A (e.g., as part of a bundled call request message that also requests a traffic channel, as an independent message, etc.). The RAN 120 receives the QoS resource request, and denies the requested QoS resources in 505B. After receiving the denial of the QoS resource request, AT 1 indicates to a user of AT 1 that the call has failed, 510B, and an attempt to make the call, if it closely follows the original call attempt, 515B, follows the process defined in FIG. 5A. Specifically, if AT 1 determines to re-attempt the call, the process advances to 500A of FIG. 5A. Alternatively, if the re-attempt does not closely follow the initial, the process will just indicate the call has failed and possibly return to the top to repeat the initial request, 500B.

Accordingly, in the example of FIG. 5B, the process of FIG. 5A is executed for a subsequent call attempt instead of during an initial call attempt. Thus, in this example, the call set-up that occurs irrespective of whether QoS resources are granted occurs after an initial call failure.

In this embodiment, the application nominally always requests quality-of-service at call-time as described above, but waits a prescribed period of time before failing the call when the requested quality-of-service guarantee cannot be provided by the network (RAN 120). During a prescribed period of time, if the requested quality-of-service guarantee becomes available (late), the application allows a delayed form of the original call to proceed rather than failing the call. If the requested quality-of-service guarantee does not become available during the prescribed period, the application fails the call. According to embodiments of the invention, the prescribed period of time can be either predefined or configurable by either the operator offering the application or the user using the service.

This embodiment can result in a graceful degradation in service by allowing a high-quality version of the application to be offered when the network is able to provide the quality-of-service guarantee, and a lower (degraded) version of the application to be offered after an initial failure when the network is able to offer the requested quality-of-service guarantee after a delay. The algorithm is useful in offering a degraded form of the service when the ability of the network to provide requested quality-of-service guarantee is highly dependent on the specific instance of when the request is made. As such the degraded form of the application takes the form of a delayed version of the original high-quality service in the embodiment of FIG. 6A, discussed next.

Figure 6A:
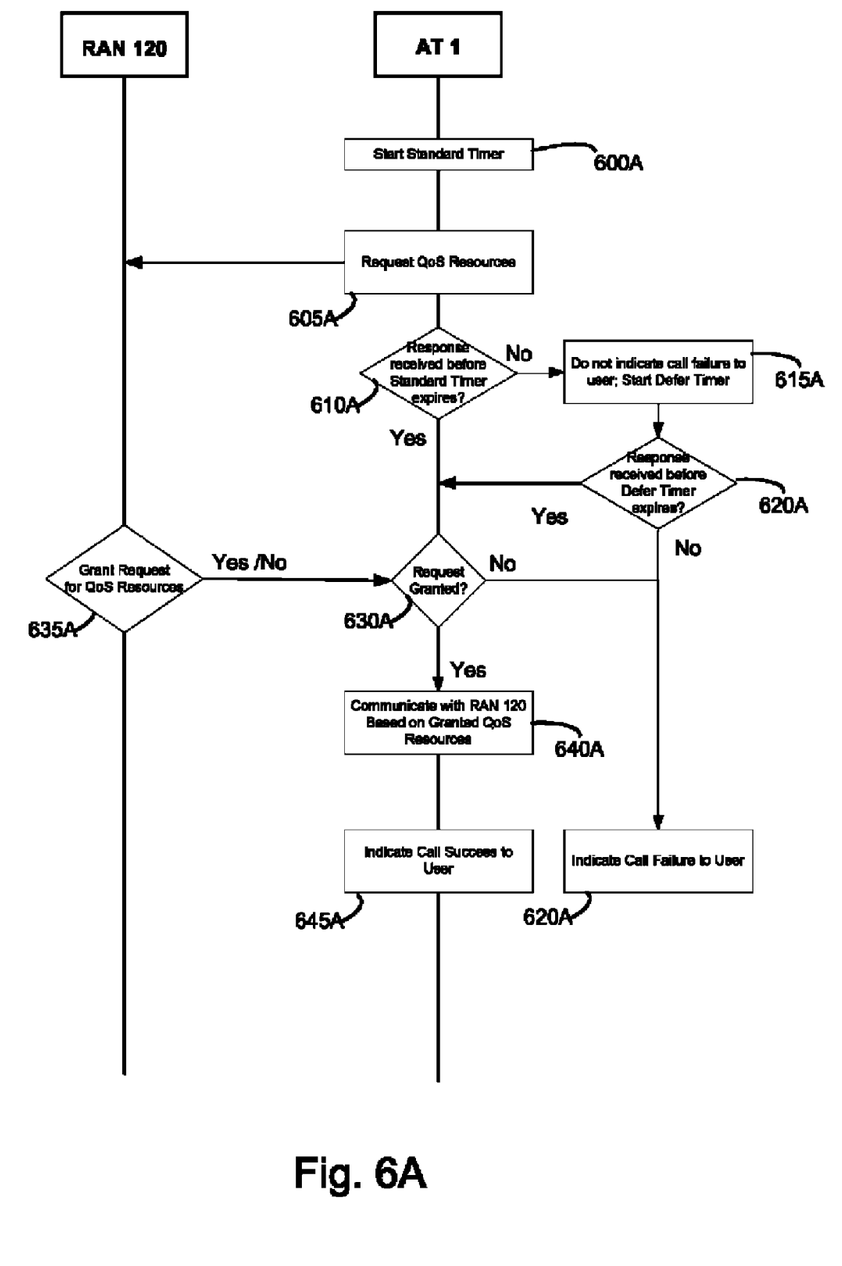
FIG. 6A illustrates a QoS resource acquisition process according to an embodiment of the present invention.

FIG. 6A illustrates a QoS resource acquisition process according to an embodiment of the invention. In 600A, a given AT ("AT 1") starts a standard timer having a given expiration period, 605A. In an example, the given expiration period can be a default expiration period, or can be set by an operator of the RAN 120. The standard timer corresponds to the timer that is used conventionally to detect whether a timeout has occurred with respect to a QoS resource request.

Accordingly, in 605A, AT 1 sends a message (e.g., on a reverse link access channel) to the RAN 120 to request QoS resources. For example, in 1xEV-DO Rev. A or 1xEV-DO Rev. B networks, the request of 605A may include a ReservationOnRequest message on the reverse link access channel. In another example, the ReservationOnRequest message may be bundled with other messaging, such as a ConnectionRequest message that requests a TCH assignment, as discussed above, for a given call (e.g., a PTT call). While the standard timer is illustrated in FIG. 6A as starting before the QoS resource request is transmitted in 605A, in another embodiment the standard timer can be started after the QoS resource request is sent. In any case, the starting of the standard timer generally approximates the time at which the QoS resource request is sent.

In 610A, AT 1 determines whether a response to the QoS resource request is received before an expiration of the standard timer. In an example, assume that AT 1 determines that no QoS response has been received 610A, and the process advances to 615A. At this point, a conventional AT would infer that QoS resources would not be granted and would fail the call. However, in 615A in embodiments of the invention, AT 1 refrains from indicating call failure and starts a second Defer Timer. It will be appreciated that while both a first timer (i.e., standard timer) and a second timer (i.e., defer timer) are implemented within the embodiment of FIG. 6A, in another embodiment of the invention, the first and second timers can be replaced by a single timer having an expiration period that is longer than the standard timer's expiration period (e.g., equal to the expiration period of the standard timer plus the expiration of the defer timer). Essentially, starting the defer timer permits AT 1 a longer wait-time before inferring that it will not be assigned QoS resources by the RAN 120 for a particular QoS resource request. Thus, reference to the defer time is intended to encompass either (i) starting a separate timer after expiration of the standard timer, or (ii) a timer period extending beyond that of the standard timer where the standard timer period and defer timer period correspond to a single timer, unless one of these alternative embodiments is referred to explicitly.

Accordingly, in 620A, AT 1 determines whether a QoS response has been received before the Defer Timer has expired. If a response is received before the Defer Timer has expired, the process advances to 630A. Otherwise, if the defer timer has expired, AT 1 indicates, to the user of AT 1, that the call attempt has failed, 625A.

Turning to the RAN 120, after the QoS resource request is received in 605A, the RAN 120 determines whether to grant the QoS resource request, 635A. In, 635A, if the RAN 120 determines not to grant the QoS resource request, the RAN 120 sends a QoS resource denial message (e.g., Fwd/RevReservationOff message). Otherwise, in 635A, if the RAN 120, if the RAN 120 determines to grant the QoS resource request, the RAN 120 sends a QoS resource grant message (e.g., Fwd/RevReservationOn message).

Turning back to AT 1, AT 1 receives the QoS resource allocation message sent by the RAN 120 (e.g., as indicated by a "Yes" in decision block 610A or 620A, depending on when the QoS resource allocation message is received), and determines that whether its requested QoS resources have been granted in 630A. In 630A, if AT 1 determines that its requested QoS resources have not been granted, AT 1 indicates call failure to the user in 620A.

Otherwise, if AT 1 determines that its requested QoS resources have been granted in 630A, AT 1 communicates with the RAN 120 and supports the call based on the granted QoS resources, 640A, and AT 1 indicates call success to the user, 645A.

In FIG. 6A, the QoS resource request of 605A has been described for an initial call attempt. However, it is possible that the process of FIG. 5A can alternatively describe a subsequent call attempt (e.g., a second call attempt) that follows an earlier call attempt, as will now be described with respect to FIG. 6B.

In this embodiment, aspects of some of the prior discussed embodiments are combined The application nominally always requests quality-of-service at call-time as described above, and fails the call when the requested quality-of-service guarantee cannot be provided by the network. However, for a (subsequent) call attempt that immediately follows a call attempt that failed due to the network previously not being able to offer the requested quality-of-service guarantee at call-time, the application waits a prescribed period of time before failing the subsequent call when the requested quality-of-service guarantee cannot be provided by the network. During the prescribed period of time, if the requested quality-of-service guarantee becomes available (late), the application allows a delayed form of the subsequent original call to proceed rather than failing the subsequent call. If the requested quality-of-service guarantee does not become available during the prescribed period, the application fails the subsequent call.

Figure 6B:
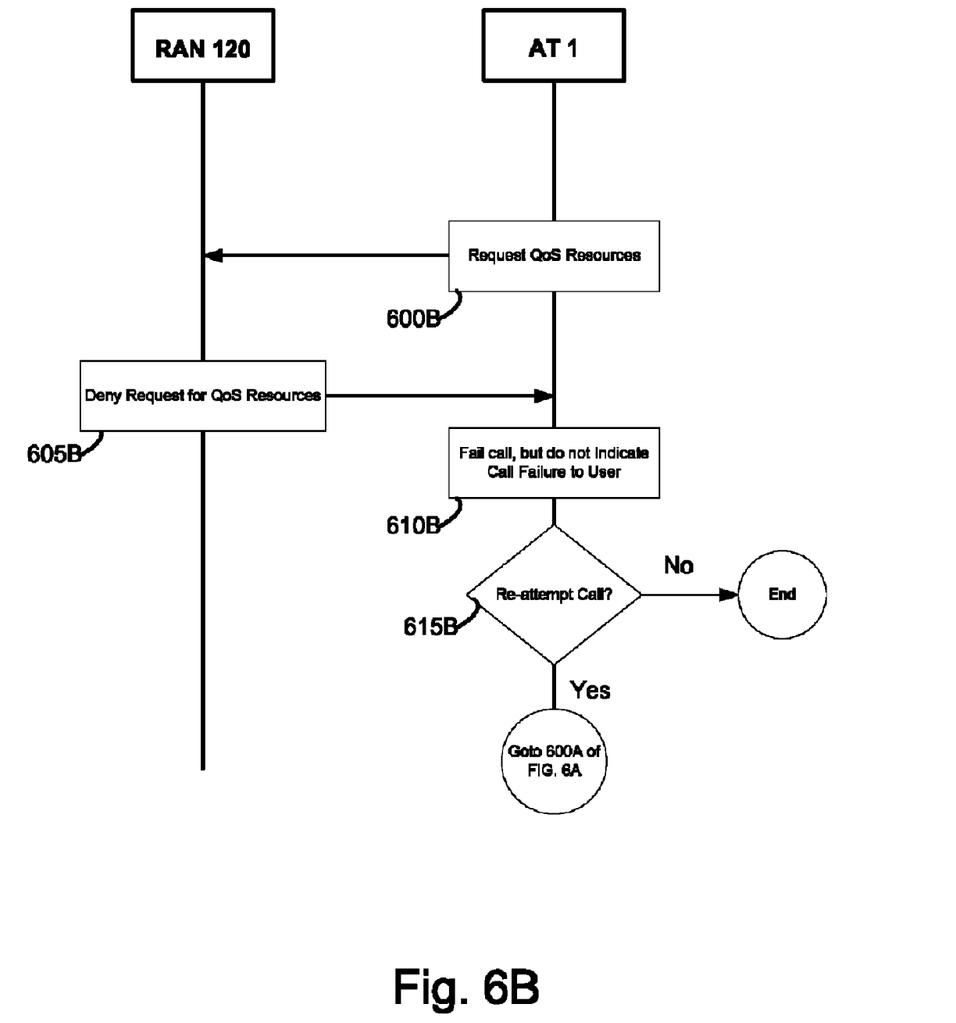
FIG. 6B illustrates a process preceding the process of FIG. 6A according to an embodiment of the invention.

Referring to FIG. 6B, in 600B, a given AT ("AT 1") sends a message to the RAN 120 to request QoS resources. In the example of FIG. 6B, assume that the QoS resource request of 600B is associated with an initial call attempt (i.e., a first time AT 1 has attempted to make a particular call). The QoS resource request may otherwise be configured as discussed above with respect to 605A of FIG. 6A (e.g., as part of a bundled call request message that also requests a traffic channel, as an independent message, etc.). The RAN 120 receives the QoS resource request, and denies the requested QoS resources in 605B (e.g., as in 405 and 410 of FIG. 4). After receiving the denial of the QoS resource request, AT 1 fails the call, but does not indicate that the call attempt has failed to a user of AT 1, 610B. AT 1 (or a user of AT 1) determines whether to re-attempt the call, 615B. In an example, AT 1 can automatically determine to re-attempt the call after an initial call failure without waiting for an explicit request from the user of AT 1 (e.g., because the user of AT 1 is not informed of the initial call failure). If AT 1 determines to re-attempt the call, the process advances to 600A of FIG. 6A.

Accordingly, in the example of FIG. 6B, the process of FIG. 6A is executed for a subsequent call attempt instead of an initial call attempt. Thus, in the example of FIG. 6B, the prolonged wait period at AT 1 for a QoS resource grant is only invoked after an initial call attempt failure. In another example, while not shown in FIG. 6A and/or FIG. 6B, each subsequent call attempt following a second call failure based on the process of FIG. 6A may be performed in accordance with FIG. 6A, such that the prolonged wait period is used for each such call attempt (e.g., because a user of AT 1 may be more concerned with setting up the call with QoS resources than setting up a call in a timely manner).

Further, in an embodiment of the invention, in FIG. 6B, the second QoS resource request (e.g., and/or any subsequent call requests) of the second call attempt upon executing the process of FIG. 6A after determining to re-attempt the call in 615B may be associated with reduced QoS resources (e.g., less stringent requirements) Alternatively, the second QoS resource request may be associated with the same QoS resources as requested in the first QoS resource request.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of allocating Quality of Service (QoS) resources within a wireless communications system, comprising:

receiving a first QoS resource request for a first level of QoS resources from an access terminal;

determining that the first level of QoS resources is not available for allocation to the access terminal;

sending a message to the access terminal indicating a denial of the first QoS resource request responsive to the determination that the first level of QoS resources are not available for allocation to the access terminal;

receiving, within a threshold period of time of receiving the first QoS resource request, a second QoS resource request from the access terminal that requests the first level of QoS resources;

responsive to the second QoS resource request being received within the threshold period of time, determining a second level of QoS resources that are available for allocation to the access terminal if the first level of QoS resources are determined not to be available for allocation to the access terminal; and sending a message to the access terminal indicating a grant of the second level of QoS resources, wherein the second QoS resource request is received without a user of the access terminal being notified of the denial of the first QoS resource request.

2. The method of claim 1, wherein at least one of the first and second QoS resource requests corresponds to a ReservationOnRequest message, and the message sent by the sending step indicating a grant corresponds to a Fwd/RevReservationOn message.

3. The method of claim 1, wherein the second level of QoS resources is lower than the first level of QoS resources.

4. The method of claim 1, wherein the first and second QoS resource requests correspond to ReservationOnRequest messages, the message sent by the sending the grant of the second level of QoS resources step corresponds to a Fwd/RevReservationOn message, and the message sent by the sending the denial of the first level of QoS resources step corresponds to a Fwd/RevReservationOff message.

5. A method of acquiring Quality of Service (QoS) resources within a wireless communications system, comprising:

transmitting an initial request for a level of QoS resources to an access network, the initial QoS resource request associated with an initial call attempt by an access terminal to set up a call;

failing the initial call attempt;

responsive to the failure of the initial call attempt and without notifying a user of the access terminal that the initial call attempt has failed:

sending a request for the level of QoS resources to the access network, the request associated with a call attempt by the access terminal to set up the call;

starting a first timer having a first expiration period;

if the first timer expires before a response to the QoS resource request has been received from the access network, starting a second timer having a second expiration period;

refraining from failing the call attempt at least until the second timer expires if no response to the QoS resource request has been received from the access network;

failing the call attempt if (ii) a response to the QoS resource request is not received from the access network before both timers expire (ii) or if a message denying the QoS resource request is received from the access network; and allowing the call to continue if a response from the access network granting the QoS resource request is received before both timers expire.

6. The method of claim 5, wherein the first and second timers correspond to a single timer, and the first and second expiration periods correspond to first and second portions of an expiration period of the single timer.

7. The method of claim 5, wherein the first and second timers correspond to different timers.

8. The method of claim 5, wherein the first expiration period corresponds to a conventional time-out period for QoS resource requests.

9. The method of claim 5, wherein both the initial QoS resource request of the transmitting step and the QoS resource request of the sending step correspond to ReservationOnRequest messages.

10. The method of claim 5, wherein both the initial QoS resource request of the transmitting step and the QoS resource request of the sending step request the same level of QoS resources.

11. The method of claim 5, wherein the failing the call attempt step infers that the initial QoS resource request was not granted if (i) an expiration period associated with a given timer expires or (ii) a Fwd/RevReservationOff message is received from the access network in response to the initial QoS resource request.

12. The method of claim 5, wherein the starting the second timer and refraining steps are performed if the sending step is initiated by the user of the access terminal relatively soon after the failing step.

13. The method of claim 5, wherein the second expiration period of the second timer is predefined or configurable by at least one of an operator of the access network and/or a user of the access terminal.

14. An access network within a wireless communications system, comprising:

means for receiving a first QoS resource request for a first level of QoS resources from an access terminal;

means for determining that the first level of QoS resources is not available for allocation to the access terminal;

means for sending a message to the access terminal indicating a denial of the first QoS resource request responsive to the determination that the first level of QoS resources are not available for allocation to the access terminal;

means for receiving, within a threshold period of time of receiving the first QoS resource request, a second QoS resource request from the access terminal that requests the first level of QoS resources;

means for determining, responsive to the second QoS resource request being received within the threshold period of time, a second level of QoS resources that are available for allocation to the access terminal if the first level of QoS resources are determined not to be available for allocation to the access terminal; and means for sending a message to the access terminal indicating a grant of the second level of QoS resources, wherein the second QoS resource request is received without a user of the access terminal being notified of the denial of the first QoS resource request.

15. An access terminal within a wireless communications system, comprising:

means for transmitting an initial request for a level of QoS resources to an access network, the initial QoS resource request associated with an initial call attempt by an access terminal to set up a call;

means for failing the initial call attempt;

means for, responsive to the failure of the initial call attempt and without notifying a user of the access terminal that the initial call attempt has failed:

sending a request for the level of QoS resources to the access network, the request associated with a call attempt by the access terminal to set up the call;

starting a first timer having a first expiration period;

if the first timer expires before a response to the QoS resource request has been received from the access network, starting a second timer having a second expiration period;

refraining from failing the call attempt at least until the second timer expires if no response to the QoS resource request has been received from the access network;

failing the call attempt if (ii) a response to the QoS resource request is not received from the access network before both timers expire (ii) or if a message denying the QoS resource request is received from the access network; and allowing the call to continue if a response from the access network granting the QoS resource request is received before both timers expire.

16. An access network within a wireless communications system, comprising:

logic configured to receive a first Quality of Service (QoS) resource request for a first level of QoS resources from an access terminal;

logic configured to determine that the first level of QoS resources is not available for allocation to the access terminal;

logic configured to send a message to the access terminal indicating a denial of the first QoS resource request responsive to the determination that the first level of QoS resources are not available for allocation to the access terminal;

logic configured to receive, within a threshold period of time of receiving the first QoS resource request, a second QoS resource request from the access terminal that requests the first level of QoS resources;

logic configured to determine, responsive to the second QoS resource request being received within the threshold period of time, a second level of QoS resources that are available for allocation to the access terminal if the first level of QoS resources are determined not to be available for allocation to the access terminal; and logic configured to send a message to the access terminal indicating a grant of the second level of QoS resources, wherein the second QoS resource request is received without a user of the access terminal being notified of the denial of the first QoS resource request.

17. An access terminal within a wireless communications system, comprising:

logic configured to transmit an initial request for a level of QoS resources to an access network, the initial QoS resource request associated with an initial call attempt by an access terminal to set up a call;

logic configured to fail the initial call attempt;

logic configured, responsive to the failure of the initial call attempt and without notifying a user of the access terminal that the initial call attempt has failed:

to send a request for the level of QoS resources to the access network, the request associated with a call attempt by the access terminal to set up the call;

to start a first timer having a first expiration period;

logic configured to, if the first timer expires before a response to the QoS resource request has been received from the access network, start a second timer having a second expiration period;

to refrain from failing the call attempt at least until the second timer expires if no response to the QoS resource request has been received from the access network;

to fail the call attempt if (ii) a response to the QoS resource request is not received from the access network before both timers expire (ii) or if a message denying the QoS resource request is received from the access network; and to allow the call to continue if a response from the access network granting the QoS resource request is received before both timers expire.

18. A non-transitory computer-readable storage medium comprising instructions, which, when executed by an access network within a wireless communications system, cause the access network to perform operations, the instructions comprising:

program code to receive a first Quality of Service (QoS) resource request for a first level of QoS resources from an access terminal;

program code to determine that the first level of QoS resources is not available for allocation to the access terminal;

program code to send a message to the access terminal indicating a denial of the first QoS resource request responsive to the determination that the first level of QoS resources are not available for allocation to the access terminal;

program code to receive, within a threshold period of time of receiving the first QoS resource request, a second QoS resource request from the access terminal that requests the first level of QoS resources;

program code to determine, responsive to the second QoS resource request being received within the threshold period of time, a second level of QoS resources that are available for allocation to the access terminal if the first level of QoS resources are determined not to be available for allocation to the access terminal; and program code to send a message to the access terminal indicating a grant of the second level of QoS resources, wherein the second QoS resource request is received without a user of the access terminal being notified of the denial of the first QoS resource request.

19. A non-transitory computer-readable storage medium comprising instructions, which, when executed by an access terminal within a wireless communications system, cause the access terminal to perform operations, the instructions comprising:

program code to transmit an initial request for a level of QoS resources to an access network, the initial QoS resource request associated with an initial call attempt by an access terminal to set up a call;

program code to fail the initial call attempt;

program code, responsive to the failure of the initial call attempt and without notifying a user of the access terminal that the initial call attempt has failed:

to send a request for the level of QoS resources to the access network, the request associated with a call attempt by the access terminal to set up the call;

to start a first timer having a first expiration period;

to, if the first timer expires before a response to the QoS resource request has been received from the access network, start a second timer having a second expiration period;

to refrain from failing the call attempt at least until the second timer expires if no response to the QoS resource request has been received from the access network;

to fail the call attempt if (ii) a response to the QoS resource request is not received from the access network before both timers expire (ii) or if a message denying the QoS resource request is received from the access network; and     to allow the call to continue if a response from the access network granting the QoS request is received before both timers expire.

* * * * *